United States Patent
Li (10) Patent No.: US 12,250,724 B2
(45) Date of Patent: Mar. 11, 2025

(54) DATA TRANSMISSION METHOD AND DEVICE, AND COMPUTER STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 356 days.

(21) Appl. No.: 17/788,728

(22) PCT Filed: Dec. 25, 2019

(86) PCT No.: PCT/CN2019/128397
§ 371 (c)(1),
(2) Date: Jun. 23, 2022

(87) PCT Pub. No.: WO2021/128082
PCT Pub. Date: Jul. 1, 2021

(65) Prior Publication Data
US 2023/0015374 A1   Jan. 19, 2023

(51) Int. Cl.
*H04W 74/0816* (2024.01)
*H04W 74/08* (2024.01)
*H04W 76/20* (2018.01)

(52) U.S. Cl.
CPC ... *H04W 74/0816* (2013.01); *H04W 74/0866* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 2016/0366594 A1* | 12/2016 | Chang | H04W 72/23 |
| 2017/0289853 A1* | 10/2017 | Ahn | H04W 28/26 |
| 2018/0206126 A1 | 7/2018 | Zhang et al. | |
| 2019/0274162 A1 | 9/2019 | Zhang et al. | |

(Continued)

FOREIGN PATENT DOCUMENTS

| | | |
|---|---|---|
| CN | 110178396 A | 8/2019 |
| CN | 110300442 A | 10/2019 |
| CN | 110536453 A | 12/2019 |

OTHER PUBLICATIONS

Huawei et al, Transmission with configured grant in NR unlicensed band, 3GPP TSG RAN WG1 Meeting #96bis R1-1903931, Xi'an, China, Apr. 8-12, 2019, Type-A.

*Primary Examiner* — Lonnie V Sweet
(74) *Attorney, Agent, or Firm* — Volpe Koenig (57) ABSTRACT

A data transmission method includes: determining one or more listening frequency bands within an unlicensed frequency range; and determining the frequency band type of at least one listening frequency band in the one or more listening frequency bands, the frequency band type including at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission.

18 Claims, 5 Drawing Sheets

(56) References Cited

U.S. PATENT DOCUMENTS

| | | | |
|---|---|---|---|
| 2020/0154475 A1* | 5/2020 | Pao | H04L 1/0038 |
| 2020/0236677 A1* | 7/2020 | Cui | H04W 16/14 |
| 2021/0022095 A1 | 1/2021 | Jiang et al. | |
| 2021/0100010 A1* | 4/2021 | Yoon | H04W 72/21 |
| 2021/0399858 A1* | 12/2021 | Yang | H04L 5/001 |

* cited by examiner

DATA TRANSMISSION METHOD AND DEVICE, AND COMPUTER STORAGE MEDIUM

CROSS REFERENCE TO RELATED APPLICATION

The present application is a U.S. National Stage of International Application No. PCT/CN2019/128397, filed on Dec. 25, 2019, the contents of all of which are incorporated herein by reference in their entireties for all purposes.

BACKGROUND

In 5th generation mobile networks or 5th generation wireless systems (5G) such as 5G new radio (NR) systems, some types of services need low latency, for example, ultra reliable and low latency communication (URLLC). As for a general requirement of this type of service, a transmitter may obtain transmission resources as soon as possible when there are data to be transmitted, so as to reduce the waiting latency of the service in buffer of the transmitter, such that the radio transmission latency is reduced.

SUMMARY

According to a first aspect of the disclosure, a data transmission method is provided. The method is applied to base station and includes:
  determining one or more listening frequency bands within an unlicensed frequency range; and
  determining a frequency band type of at least one listening frequency band in the one or more listening frequency bands, the frequency band type including at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission.

According to a second aspect of the disclosure, a data transmission method is provided. The method is applied to user equipment (UE) and includes:
  determining one or more listening frequency bands within an unlicensed frequency range; and
  determining a frequency band type of at least one listening frequency band in the one or more listening frequency bands within the unlicensed frequency range, the frequency band type including at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission.

According to a third aspect of the disclosure, a data transmission apparatus is provided, and includes:
  a processor; and
  a memory, configured to store processor-executable instructions.

The processor is configured to implement the data transmission method in any one of the above technical solutions applied to a base station side by executing the executable instructions.

According to a fourth aspect of the disclosure, a data transmission apparatus is provided, and includes:
  a processor; and
  a memory, configured to store processor-executable instructions.

The processor is configured to implement the data transmission method in any one of the above technical solutions applied to a UE side by executing the executable instructions.

According to a fifth aspect of the disclosure, a non-transitory computer readable storage medium is provided. Executable instructions are stored in the non-transitory computer readable storage medium, and the executable instructions, when executed by a processor, can implement the data transmission method in any one of the above technical solutions applied to a base station side.

According to a sixth aspect of the disclosure, a non-transitory computer readable storage medium is provided. Executable instructions are stored in the non-transitory computer readable storage medium, and the executable instructions, when executed by a processor, can implement the data transmission method in any one of the above technical solutions applied to a UE side.

It should be understood that the above general descriptions and later detailed descriptions are merely examples and illustration, and cannot limit the disclosure.

BRIEF DESCRIPTION OF THE DRAWINGS

The accompanying drawings, which are incorporated in and constitute a part of the specification, illustrate examples consistent with the disclosure and together with the specification serve to explain the principles of the disclosure.

DETAILED DESCRIPTION

Examples will be described in detail here, instances of which are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the application. Rather, they are merely instances of apparatuses and methods consistent with some aspects of the examples of the application as detailed in the appended claims.

The terms used in the examples of the disclosure are merely for the purpose of describing specific examples, and not intended to limit the examples of the disclosure. The singular forms "a", "an" and "the" used in the examples of the disclosure and the appended claims are also intended to include the plural form unless the context clearly indicates other meanings. It should also be understood that the term "and/or" as used herein refers to and includes any or all possible combinations of one or more associated items listed.

It should be understood that although the terms "first", "second", "third", etc. may be used to describe various information in the examples of the disclosure, such information should not be limited to these terms. These terms are merely used to distinguish the same type of information from each other. For example, without departing from the scope of the examples of the disclosure, first information may also be referred to as second information, and similarly, the second information may also be referred to as the first information. Depending on the context, the words "if" and "when" as used herein can be interpreted as "at the time of" or "in case of" or "in response to determining that".

The disclosure relates to communication technologies, in particular to a data transmission method and apparatus, and a computer storage medium.

Figure 1:
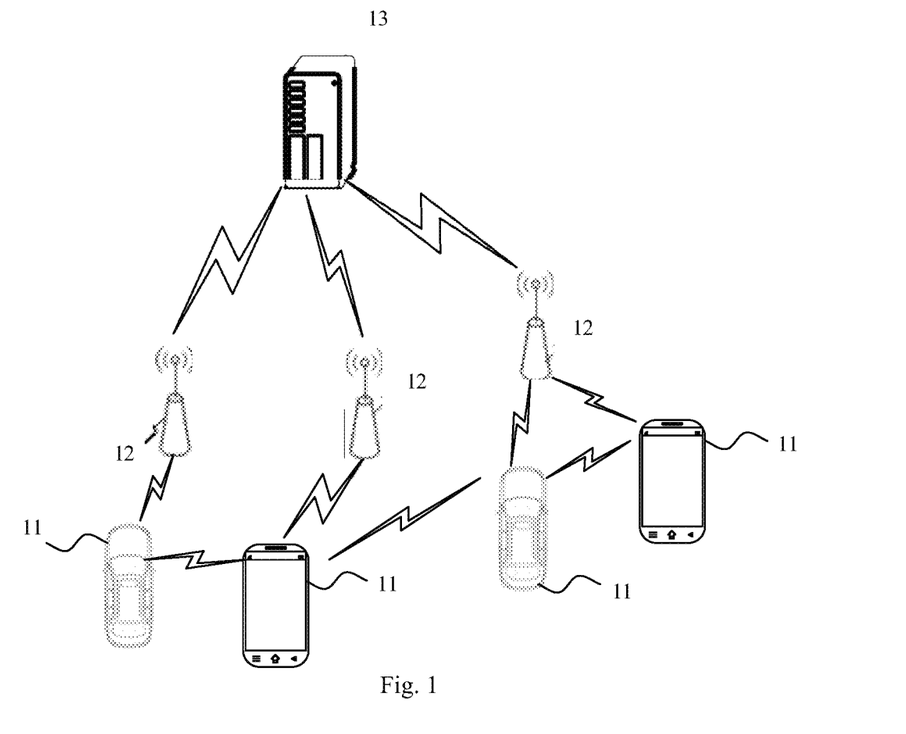
FIG. 1 is a schematic structural diagram of a wireless communication system according to an example.

Please refer to FIG. 1. FIG. 1 illustrates a schematic structural diagram of a wireless communication system provided by an example of the disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be Internet of Things terminals, such as sensor devices, mobile phones (or referred to as "cellular" phones) and computers with Internet of Things terminals. For example, the terminals may be fixed, portable, pocket-size, handheld, computer built-in or vehicle-mounted apparatuses. For example, stations (STAs), subscriber units, subscriber stations, mobile stations, mobiles, remote stations, access points, remote terminals, access terminals, user terminals, user agents, user devices, or user equipment (UE). Or, the terminals 11 may also be unmanned aircraft devices. Or, the terminals 11 may also be vehicle-mounted devices, such as a trip computer with a wireless communication function, or a wireless communication device externally connected to a trip computer. Or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also referred to as a long term evolution (LTE) system; or, the wireless communication system may also be a 5G system, also referred to as a new radio (NR) system or 5G NR system. Or, the wireless communication system may also be a next-generation system of the 5G system. An access network in the 5G system may be referred to as a new generation-radio access network (NG-RAN). Or, the wireless communication system may be a machine-type communication (MTC) system.

The base stations 12 may be evolved base stations (eNB) adopted in the 4G system. Or, the base stations 12 may also be base stations adopting centralized and distributed architectures (gNB) in the 5G system. When the base stations 12 adopt the centralized and distributed architectures, the base stations usually include a central unit (CU) and at least two distributed units (DU). Protocol stacks of a packet data convergence protocol (PDCP) layer, a radio link control (RLC) layer and a media access control (MAC) layer are disposed in the central unit. Protocol stacks of physical (PHY) layers are disposed in the distributed units. Specific implementations of the base stations 12 are not limited in the example of the disclosure.

The base stations 12 and the terminals 11 may establish wireless connection through wireless radio. In different implementations, the wireless radio is a wireless radio based on the 4G standard; or, the wireless radio is a wireless radio based on the 5G standard, such as new radio; or, the wireless radio may also be a wireless radio based on the next-generation mobile communication standard of 5G.

In some examples, the terminals 11 may also establish end to end (E2E) connectivity in accordance with, for example, vehicle to vehicle (V2V) communication, vehicle to infrastructure (V2I) communication and vehicle to pedestrian (V2P) communication in vehicle to everything (V2X) communication.

In some examples, the above wireless communication system may further include a network management device 13.

The plurality of base stations 12 are connected with the network management device 13 respectively. The network management device 13 may be a core network device in the wireless communication system, for example, the network management device 13 may be a mobility management entity (MME) in an evolved packet core (EPC). Or, the network management device may also be other core network devices, such as a serving gate way (SGW), a public data network gate way (PGW), a policy and charging rules function (PCRF) unit or a home subscriber server (HSS). The implementation form of the network management device 13 is not limited in the example of the disclosure.

In 5G NR, some types of service require low latency, for example, the ultra reliable and low latency communication (URLLC) service type. As for a general requirement of this type of service, a transmitter may obtain transmission resources as soon as possible when there are data to be transmitted, so as to reduce the waiting latency of the service in buffer of the transmitter, such that the radio transmission latency is reduced.

In a 5G unlicensed frequency range communication system, the transmitter usually sends data by using a listen before talk (LBT) mechanism. When a base station and user equipment (UE) perform channel listening, an LBT band (listening frequency band) serves as a unit in the frequency domain. A frequency band used by the base station and the UE for communication may be wide enough to cover a plurality of LBT bands. The base station and the UE may occupy a channel in a wideband manner, that is, the base station or the UE may listen all listening frequency bands within all frequency ranges respectively before sending data, and may send data merely on an LBT band where LBT is successful. In the process of sending downlink data by the base station, if the UE has uplink data to be sent, the UE cannot obtain transmission resources until the base station completes sending the downlink data, such that the waiting latency of transmission of the uplink data may be increased. In the same way, in the process of transmitting uplink data by the UE, if the base station has downlink data to be sent, the base station cannot obtain transmission resources until the UE completes sending the uplink data, such that the waiting latency of transmission of the downlink data may be increased.

In a 5G unlicensed frequency range system, the transmitter needs to listen a channel before sending data, and may successfully occupy the channel to send data when finding that interference in the channel is lower than a certain threshold via listening, that is, using a listen before talk (LBT) mechanism. In a current 5G unlicensed frequency range communication system, channel listening performed by a base station and UE is based on an LBT band (listening frequency band) as a unit in the frequency domain. One LBT band is 20 MHz in the frequency domain. A frequency band used by the base station and the UE for communication may be wide enough to cover a plurality of LBT bands. For example, if the base station and the UE communicate using an unlicensed frequency range of 80 MHz, the unlicensed frequency range may be divided into four LBT bands. The base station and the UE may occupy the channel in a wideband manner, that is, the base station or the UE may listen the four LBT bands respectively within all the frequency ranges of 80 MHz before sending data, and may send data merely on an LBT band where LBT is successful.

When an unlicensed frequency range is used for transmitting low-latency services, the unlicensed frequency range is usually used in indoor scenarios where an interference environment is controllable, for example, control networks deployed in indoor factories, and indoor gaming sensor networks. In such scenarios, the unlicensed frequency range used by the base station and the UE for communication is usually subject to less external interference, which mainly comes from the interference of endpoints in an indoor local network. For the endpoints in the local network, if there is an idle LBT band, a sender may successfully listen and occupy the channel with a high probability when performing channel listening.

However, if the base station performs LBT successfully on the above four LBT bands, the base station may send downlink data by using all four LBT bands. In the process of sending downlink data by the base station, if the UE has uplink data to be sent, the UE cannot obtain transmission resources until the base station completes sending the downlink data, such that the waiting latency of transmission of the uplink data may be increased. In the same way, if the UE occupies the four LBT bands to transmit uplink data, when the base station has downlink data to be sent, the base station cannot obtain transmission resources until the UE completes sending the uplink data, such that the waiting latency of transmission of the downlink data may be increased.

Based on the above wireless communication system, the disclosure provides examples of the method to reduce the latency of data transmission in an unlicensed frequency range.

Figure 2:
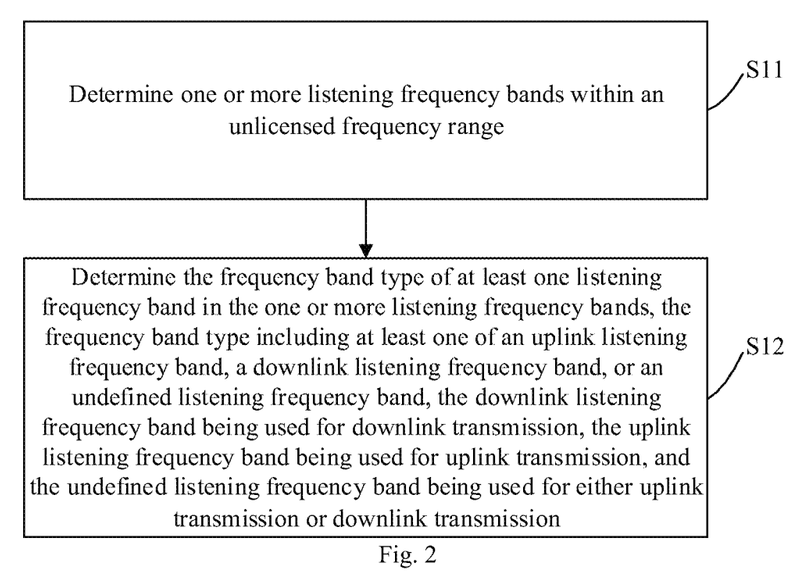
FIG. 2 is a first flow diagram of a data transmission method according to an example.

FIG. 2 is a first flow diagram of a data transmission method according to an example. As shown in FIG. 2, the data transmission method is applied to a base station, and includes the following steps:

in step S11, one or more listening frequency bands within an unlicensed frequency range are determined; and in step S12, a frequency band type of at least one listening frequency band in the one or more listening frequency bands is determined. The frequency band type includes at least one of an uplink listening frequency band, a downlink listening frequency band, or an undefined listening frequency band. The downlink listening frequency band is used for downlink transmission. The uplink listening frequency band is used for uplink transmission. The undefined listening frequency band is used for either uplink transmission or downlink transmission.

In this way, since the frequency band type of at least one listening frequency band within the unlicensed frequency range is determined, the waiting latency of transmission of uplink data or downlink data can be reduced, which at least helps to reduce the latency of uplink data or downlink data transmission within the unlicensed frequency range.

In some examples, step S12 includes:
the frequency band type of at least one listening frequency band in the one or more listening frequency bands is determined as the uplink listening frequency band, the uplink listening frequency band being used for uplink transmission.

In this way, since the frequency band type of at least one listening frequency band within the unlicensed frequency range is determined as the uplink listening frequency band, it is ensured that a listening frequency band is available for uplink transmission when uplink data need to be sent, and there is no case where uplink data need to be sent but transmission resources cannot be obtained until downlink data have been sent, such that the waiting latency of transmission of the uplink data may be reduced, and the latency of uplink data transmission is reduced.

In some examples, step S12 includes:
the frequency band type of at least one listening frequency band in the one or more listening frequency bands is determined as the downlink listening frequency band, the downlink listening frequency band being used for downlink transmission.

In this way, since the frequency band type of at least one listening frequency band within the unlicensed frequency range is determined as the downlink listening frequency band, it is ensured that a listening frequency band is available for downlink transmission when downlink data need to be sent, and there is no case where downlink data need to be sent but transmission resources cannot be obtained until uplink data have been sent, such that the waiting latency of transmission of the downlink data may be reduced, and the latency of downlink data transmission is reduced.

In some examples, step S12 includes:
the frequency band type of at least one listening frequency band in the one or more listening frequency bands is determined as the uplink listening frequency band, the uplink listening frequency band being used for uplink transmission; and the frequency band type of at least one listening frequency band in the one or more listening frequency bands is determined as the downlink listening frequency band, the downlink listening frequency band being used for downlink transmission.

In this way, since the frequency band type of at least one listening frequency band within the unlicensed frequency range is determined as the downlink listening frequency band, and the frequency band type of at least one listening frequency band within the unlicensed frequency range is determined as the uplink listening frequency band, there may be no case where uplink data need to be sent but transmission resources cannot be obtained until downlink data have been sent, such that the waiting latency of transmission of the uplink data may be reduced, and the latency of uplink data transmission is reduced; and there may be no case where downlink data need to be sent but transmission resources cannot be obtained until uplink data have been sent, such that the waiting latency of transmission of the downlink data may be reduced, and the latency of downlink data transmission is reduced.

In some examples, the method further includes:
listening frequency band configuration information is sent to user equipment (UE). The listening frequency band configuration information includes frequency band type indication information, and the frequency band type indication information is used for indicating the frequency band type of one or more listening frequency bands within the unlicensed frequency range.

In this way, the UE can be notified of the type of one or more listening frequency bands within the unlicensed frequency range, such that the UE can select the corresponding listening frequency band to perform a corresponding operation based on the type, configured by the base station, of the listening frequency band. For example, a listening frequency band with the type being the downlink listening frequency band is selected to listen to downlink information; and a listening frequency band with the type being the uplink listening frequency band is selected to transmit uplink information.

In some implementations, sending the listening frequency band configuration information to the UE includes:

the listening frequency band configuration information is sent to the UE via a broadcast message.

In this way, the listening frequency band configuration information can be sent to the UE via the broadcast message to inform the UE of the listening frequency band configuration information, and the quantity of signaling can be reduced by indicating the listening frequency band configuration information via existing signaling such as the broadcast message.

In some implementations, sending the listening frequency band configuration information to the UE includes:

the listening frequency band configuration information is sent to the UE via RRC layer signaling.

In this way, the listening frequency band configuration information can be sent to the UE via the RRC layer signaling to inform the UE of the listening frequency band configuration information. Different uplink and downlink listening frequency bands may be configured for different UE via the RRC signaling, such that each listening frequency band may achieve load balance.

In some implementations of the disclosure, the frequency band configuration information may be sent via any existing or new signaling, which is not limited in the implementations of the disclosure.

In some implementations, determining the frequency band type of at least one listening frequency band in the one or more listening frequency bands includes:

the frequency band type of at least one listening frequency band in the one or more listening frequency bands is determined by means of protocol agreement.

For example, when the unlicensed communication frequency range includes a plurality of listening frequency bands, it is agreed in the protocol that the frequency band type of one or more specific listening frequency bands is the uplink listening frequency band, the downlink listening frequency band, or the undefined listening frequency band. For example, it may be agreed in the protocol that among the plurality of listening frequency bands, a listening frequency band with the lowest frequency is the uplink listening frequency band, and a listening frequency band with the highest frequency is the downlink listening frequency band.

In some examples, a frequency of a listening frequency band with the frequency band type being the uplink listening frequency band is lower than a frequency of a listening frequency band with the frequency band type being the downlink listening frequency band.

In this way, since the lower the frequency of a frequency band, the smaller the propagation loss, and the transmitting power of a terminal is smaller than the transmitting power of the base station, the use of the uplink listening frequency band with the lower frequency is beneficial to enhancing the uplink coverage and balancing the uplink and downlink coverage.

In some examples, determining the frequency band type of at least one listening frequency band in the one or more listening frequency bands includes:

in response to determining that communication with the UE is performed via the unlicensed frequency range and the unlicensed frequency range used for communication includes two or more listening frequency bands, the frequency band type is determined for at least one of the listening frequency bands. The quantity of listening frequency bands with the frequency band type being downlink listening frequency bands or uplink listening frequency bands is less than the total quantity of listening frequency bands included in the unlicensed frequency range.

In this way, it can be ensured that in the listening frequency bands within the unlicensed frequency range, there are both a listening frequency band used for transmitting uplink information and a listening frequency band used for transmitting downlink information, which helps to reduce the latency of data transmission.

In some examples, determining the frequency band type of at least one listening frequency band in the one or more listening frequency bands includes:

in response to receiving a scheduling request sent by the UE, the frequency band type of at least one listening frequency band in the one or more listening frequency bands is determined as the uplink listening frequency band.

In this way, the listening frequency band used for transmitting uplink information can be configured for the UE. Since the base station may not send downlink information, including downlink control information and downlink data information, on the listening frequency band with the frequency band type being the uplink listening frequency band, it can be ensured that a listening frequency band is available for uplink transmission when the UE has uplink data to be sent, and there is no case where uplink data need to be sent but transmission resources cannot be obtained until the downlink data have been sent, such that the waiting latency of transmission of the uplink data may be reduced, and the latency of uplink data transmission is reduced.

In some examples, determining the frequency band type of at least one listening frequency band in the one or more listening frequency bands includes:

in response to configuring the UE with resources for periodically transmitting physical uplink shared channel (PUSCH) information, the frequency band type of at least one listening frequency band in the one or more listening frequency bands is determined as the uplink listening frequency band.

In this way, a listening frequency band for transmitting uplink information may be configured for the UE, such that the UE may transmit uplink signaling or data spontaneously. For example, the UE transmits CG-PUSCH (i.e. configured grant-PUSCH or UL grant free PUSCH) information by using the listening frequency band with the frequency band type being the uplink listening frequency band.

According to the technical solution of the example of the disclosure, one or more listening frequency bands within the unlicensed frequency range are determined; and the frequency band type of at least one listening frequency band in the one or more listening frequency bands is determined. The frequency band type includes at least one of the uplink listening frequency band, the downlink listening frequency band, or the undefined listening frequency band. The downlink listening frequency band is used for downlink transmission. The uplink listening frequency band is used for uplink transmission. The undefined listening frequency band is used for either uplink transmission or downlink transmission. In this way, since the frequency band type of at least one listening frequency band within the unlicensed frequency range is determined, the waiting latency of transmission of uplink data or downlink data can be reduced at least, which helps to reduce the latency of data transmission within the unlicensed frequency range.

Figure 3:
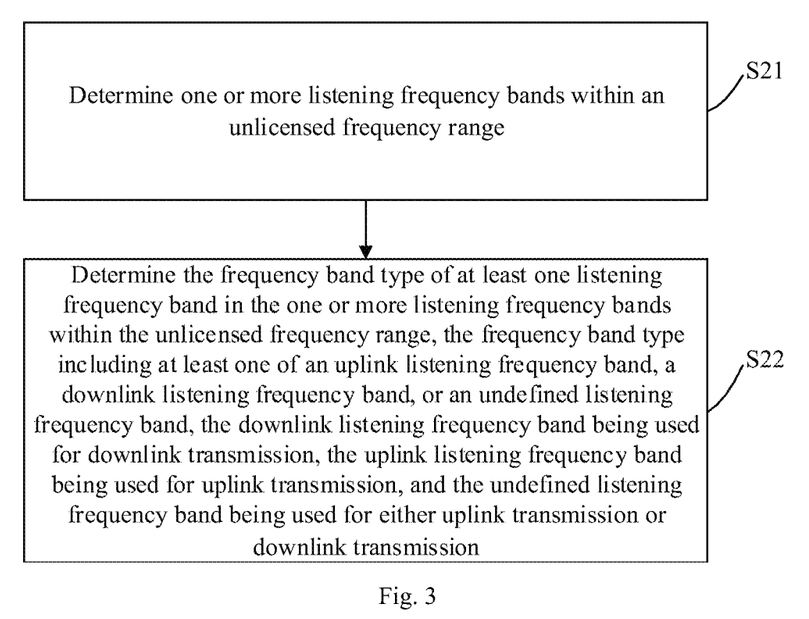
FIG. 3 is a second flow diagram of a data transmission method according to an example.

FIG. 3 is a second flow diagram of a data transmission method according to an example. As shown in FIG. 3, the data transmission method is applied to user equipment (UE), and includes the following steps:

in step S21, one or more listening frequency bands within an unlicensed frequency range are determined; and in step S22, a frequency band type of at least one listening frequency band in the one or more listening frequency bands within the unlicensed frequency range is determined. The frequency band type includes at least one of an uplink listening frequency band, a downlink listening frequency band, or an undefined listening frequency band. The downlink listening frequency band is used for downlink transmission. The uplink listening frequency band is used for uplink transmission. The undefined listening frequency band is used for either uplink transmission or downlink transmission.

In this way, since the frequency band type of at least one listening frequency band within the unlicensed frequency range is determined, the waiting latency of transmission of uplink data or downlink data can be reduced, which at least helps to reduce the latency of data transmission within the unlicensed frequency range.

In the above solution, before determining the frequency band type of at least one listening frequency band, the method further includes:

listening frequency band configuration information sent by a base station is obtained. The listening frequency band configuration information includes frequency band type indication information, and the frequency band type indication information is used for indicating the frequency band type of one or more listening frequency bands within the unlicensed frequency range.

In this way, the UE can determine the type of one or more listening frequency bands within the unlicensed frequency range according to the listening frequency band configuration information, such that the UE can select the corresponding listening frequency band to perform corresponding operation based on the type, configured by the base station, of the listening frequency band. For example, a listening frequency band with the type being the downlink listening frequency band is selected to listen downlink information; and a listening frequency band with the type being the uplink listening frequency band is selected to transmit uplink information.

In some examples, obtaining the listening frequency band configuration information includes:

a broadcast message is received; and the listening frequency band configuration information is determined based on the broadcast message.

In this way, the UE may obtain the listening frequency band configuration information via the broadcast message.

In some examples, obtaining the listening frequency band configuration information includes:

RRC layer signaling is received; and the listening frequency band configuration information is determined based on the RRC layer signaling.

In this way, the UE may obtain the listening frequency band configuration information via the RRC layer signaling.

In some implementations of the disclosure, the frequency band configuration information may be sent via any existing or new signaling, which is not limited in the implementations of the disclosure.

In some examples, determining the frequency band type of at least one listening frequency band includes:

the frequency band type of at least one listening frequency band in the one or more listening frequency bands is determined by means of protocol agreement.

For example, when the unlicensed communication frequency range includes a plurality of listening frequency bands, it is agreed in the protocol that the frequency band type of one or more specific listening frequency bands is the uplink listening frequency band, the downlink listening frequency band, or the undefined listening frequency band. For example, it may be agreed in the protocol that among the plurality of listening frequency bands, a listening frequency band with the lowest frequency is the uplink listening frequency band, and a listening frequency band with the highest frequency is the downlink listening frequency band.

In some examples, determining the frequency band type of at least one listening frequency band includes:

in response to determining that communication with the base station is performed via the unlicensed frequency range and the unlicensed frequency range used for communication includes two or more listening frequency bands, the frequency band type for at least one of the listening frequency bands is determined. The quantity of listening frequency bands with the frequency band type being the downlink listening frequency bands or the uplink listening frequency bands is less than the total quantity of listening frequency bands included in the unlicensed frequency range.

In this way, it can be ensured that in the listening frequency bands within the unlicensed frequency range, there are both a listening frequency band used for transmitting uplink information and a listening frequency band used for transmitting downlink information, which helps to reduce the latency of data transmission.

In some examples, the method further includes:

a scheduling request is sent via a listening frequency band with the frequency band type being the uplink listening frequency band.

In this way, it can be ensured that a listening frequency band is available for uplink transmission when the UE has uplink data to be sent, and there is no case where uplink data need to be sent but transmission resources cannot be obtained until downlink data have been sent, such that the waiting latency of transmission of the uplink data may be reduced, and the latency of uplink data transmission is reduced.

In some examples, the method further includes:

in response to determining that a scheduling instruction sent by the base station is received and the scheduling instruction indicates to transmit uplink data on a listening frequency band with the frequency band type being the downlink listening frequency band, the scheduling instruction is ignored.

In this way, it can be ensured that the UE does not occupy a listening frequency band resource with the frequency band type being the downlink listening frequency band.

In some examples, the method further includes:
physical uplink shared channel (PUSCH) information is transmitted periodically via a listening frequency band with the frequency band type being the uplink listening frequency band.

In this way, the UE may transmit uplink signaling or data spontaneously. For example, the UE transmits CG-PUSCH information by using the listening frequency band with the frequency band type being the uplink listening frequency band. CG-PUSCH refers to Configured grant-PUSCH, or UL grant free PUSCH.

According to the technical solutions of the example of the disclosure, one or more listening frequency bands within the unlicensed frequency range are determined; and the frequency band type of at least one listening frequency band in the one or more listening frequency bands is determined. The frequency band type includes at least one of the uplink listening frequency band, the downlink listening frequency band, or the undefined listening frequency band. The downlink listening frequency band is used for downlink transmission. The uplink listening frequency band is used for uplink transmission. The undefined listening frequency band is used for either uplink transmission or downlink transmission. In this way, since the frequency band type of at least one listening frequency band within the unlicensed frequency range is determined, the waiting latency of transmission of uplink data or downlink data can be reduced, which at least helps to reduce the latency of data transmission within the unlicensed frequency range.

Figure 4:
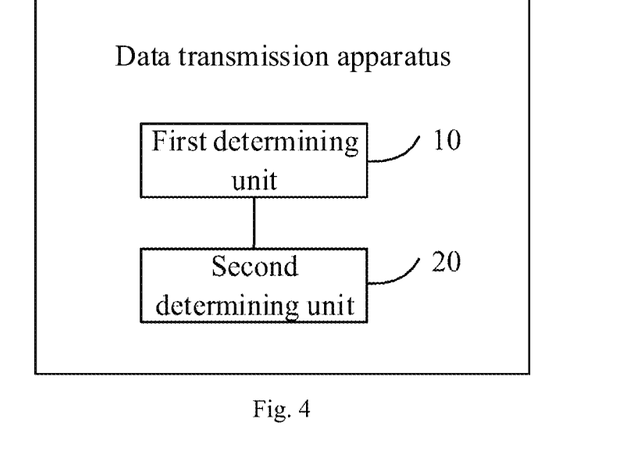
FIG. 4 is a first block diagram of a data transmission apparatus according to an example.

FIG. 4 is a first block diagram of a data transmission apparatus according to an example. The data transmission apparatus is applied to a base station side. Referring to FIG. 4, the apparatus includes a first determining unit 10 and a second determining unit 20.

The first determining unit 10 is configured to determine one or more listening frequency bands within an unlicensed frequency range.

The second determining unit 20 is configured to determine a frequency band type of at least one listening frequency band in the one or more listening frequency bands, the frequency band type including at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission.

In the above solution, the apparatus further includes:
a first communication unit (not shown in FIG. 4), configured to send listening frequency band configuration information to user equipment (UE), the listening frequency band configuration information including frequency band type indication information, and the frequency band type indication information being used for indicating the frequency band type of one or more listening frequency bands within the unlicensed frequency range.

In the above solution, the first communication unit is configured to:
send, via a broadcast message, the listening frequency band configuration information to the UE; or
send, via radio resource control (RRC) layer signaling, the listening frequency band configuration information to the UE.

In the above solution, a frequency of a listening frequency band with the frequency band type being the uplink listening frequency band is lower than a frequency of a listening frequency band with the frequency band type being the downlink listening frequency band.

In the above solution, the second determining unit 20 is configured to:
determine, in response to determining that communication with UE is performed via the unlicensed frequency range and the unlicensed frequency range used for communication includes two or more listening frequency bands, the frequency band type for at least one of the listening frequency bands. The quantity of listening frequency bands with the frequency band type being downlink listening frequency bands or uplink listening frequency bands is less than the total quantity of listening frequency bands included in the unlicensed frequency range.

In the above solution, the second determining unit 20 is configured to:
determine, in response to receiving a scheduling request sent by the UE, that the frequency band type of at least one listening frequency band in the one or more listening frequency bands is the uplink listening frequency band.

In the above solution, the second determining unit 20 is configured to:
determine, in response to configuring the UE with resources for periodically transmitting physical uplink shared channel (PUSCH) information, that the frequency band type of at least one listening frequency band in the one or more listening frequency bands is the uplink listening frequency band.

As for the apparatus in the above examples, the specific manner in which each module performs operations has been described in detail in the examples of the method, and detailed description will not be given here.

In practical applications, the specific structures of the first determining unit 10, the second determining unit 20, and the first communication unit may all be implemented by the data transmission apparatus or a central processing unit (CPU), a micro controller unit (MCU), a digital signal processor (DSP), or a programmable logic controller (PLC), etc. in the base station to which the data transmission apparatus belongs.

The data transmission apparatus of the example may be disposed on the base station side.

Those skilled in the art should understand that the functions of each processing module in the data transmission apparatus of the example of the disclosure can be understood by referring to the above description of the data transmission method applied to the base station side. Each processing module in the data transmission apparatus of the example of the disclosure can be implemented by an analog circuit that implements the functions of the example of the disclosure, or by the operation of software that performs the functions of the example of the disclosure on a terminal.

The data transmission apparatus of the example of the disclosure can reduce the latency of data transmission within the unlicensed frequency range.

Figure 5:
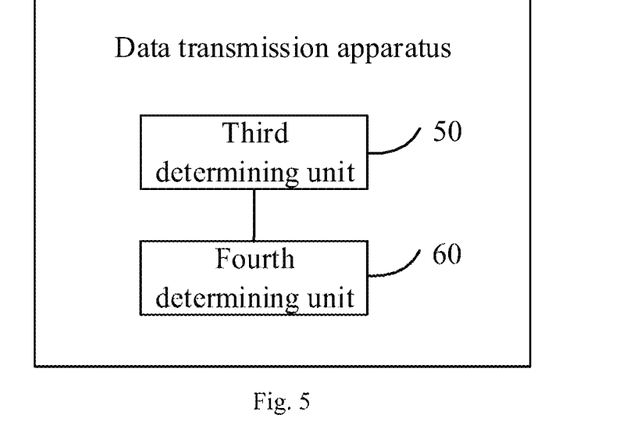
FIG. 5 is a second block diagram of a data transmission apparatus according to an example.

FIG. 5 is a second block diagram of a data transmission apparatus according to an example. The data transmission apparatus is applied to a UE side. Referring to FIG. 5, the apparatus includes a third determining unit 50 and a fourth determining unit 60.

The third determining unit 50 is configured to determine one or more listening frequency bands within an unlicensed frequency range.

The fourth determining unit 60 is configured to determine a frequency band type of at least one listening frequency band in the one or more listening frequency bands within the unlicensed frequency range, the frequency band type including at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission.

In some examples, the apparatus includes:
a second communication unit (not shown in FIG. 5), configured to:
obtain, before determining the frequency band type of at least one listening frequency band, listening frequency band configuration information sent by a base station, the listening frequency band configuration information including frequency band type indication information, and the frequency band type indication information being used for indicating the frequency band type of one or more listening frequency bands within the unlicensed frequency range.

In some examples, the second communication unit is configured to:
receive a broadcast message; and
determine, based on the broadcast message, the listening frequency band configuration information.

In some examples, the second communication unit is configured to:
receive RRC layer signaling; and
determine, based on the RRC layer signaling, the listening frequency band configuration information.

In the above solution, the fourth determining unit 60 is configured to:
determine, in response to determining that communication with the base station is performed via the unlicensed frequency range and the unlicensed frequency range used for communication includes two or more listening frequency bands, the frequency band type for at least one of the listening frequency bands. The quantity of listening frequency bands with the frequency band type being the downlink listening frequency bands or the uplink listening frequency bands is less than the total quantity of listening frequency bands included in the unlicensed frequency range.

In some examples, the second communication unit is configured to:
send, via a listening frequency band with the frequency band type being the uplink listening frequency band, a scheduling request.

In some examples, the second communication unit is configured to:
ignore, in response to determining that a scheduling instruction sent by the base station is received and the scheduling instruction indicates to transmit uplink data on a listening frequency band with the frequency band type being the downlink listening frequency band, the scheduling instruction.

In some examples, the second communication unit is configured to:
transmit, via a listening frequency band with the frequency band type being the uplink listening frequency band, physical uplink shared channel (PUSCH) information periodically.

The data transmission apparatus of the example may be disposed on the UE side.

Those skilled in the art should understand that the functions of each processing module in the data transmission apparatus of the example of the disclosure can be understood by referring to the above description of the data transmission method applied to the UE side. Each processing module in the data transmission apparatus of the example of the disclosure can be implemented by an analog circuit that implements the functions of the example of the disclosure, or by the operation of software that performs the functions of the example of the disclosure on a terminal.

In practical applications, the specific structures of the third determining unit 50, the fourth determining unit 60, and the second communication unit may all be implemented by the data transmission apparatus or a CPU, an MCU, a DSP, or a PLC, etc. in the UE to which the data transmission apparatus belongs.

The data transmission apparatus of the example of the disclosure can reduce the latency of data transmission within the unlicensed frequency range.

Figure 6:
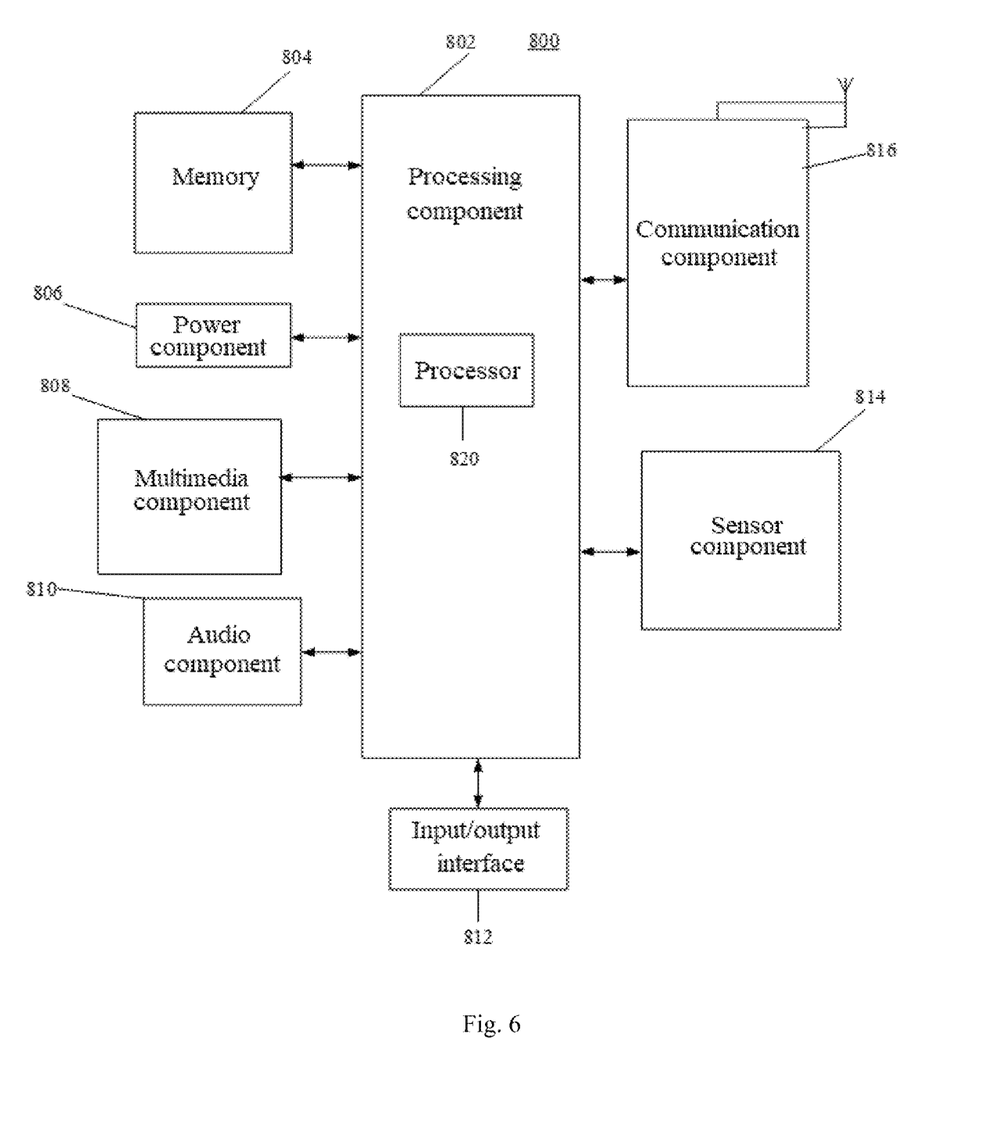
FIG. 6 is a block diagram of an apparatus 800 for implementing data transmission processing according to an example.

FIG. 6 is a block diagram of an apparatus 800 for implementing data transmission processing according to an example. For example, the apparatus 800 may be a mobile phone, a computer, a digital broadcasting terminal, a messaging device, a game console, a tablet device, a medical device, a fitness device, a personal digital assistant, etc.

Referring to FIG. 6, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the apparatus 800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Instances of these data include instructions for any application or method operating on the apparatus 800, contact data, phonebook data, messages, pictures, videos, etc. The memory 804 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 806 provides power for various components of the apparatus 800. The power component 806 may include a power management system, one or more power sources, and other components associated with generating, managing and distributing power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swiping and gestures on the touch panel. The touch sensor can sense the boundary of the touch or swiping operation, and can also detect the duration and pressure related to the touch or swiping operation. In some examples, the multimedia component 808 includes a front camera and/or a rear camera. When the apparatus 800 is in an operation mode, such as a shooting mode or a video mode, the front camera and/or the rear camera can receive external multimedia data. Each of the front camera and the rear camera can be a fixed optical lens system or has the focal length and optical zoom capability.

The audio component 810 is configured to output and/or input audio signals. For example, the audio component 810 includes a microphone (MIC) configured to receive an external audio signal when the apparatus 800 is in the operation mode, such as a call mode, a recording mode, and a speech recognition mode. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module which can be a keyboard, a click wheel, a button, etc. These buttons may include but not limited to: a home button, volume buttons, a start button and a lock button.

The sensor component 814 includes one or more sensors for providing state evaluation of various aspects of the apparatus 800. For example, the sensor component 814 can detect an on/off state of the apparatus 800 and the relative positioning of the components, for example, the component is a display and a keypad of the apparatus 800. The sensor component 814 can also detect the change of the position of the apparatus 800 or one component of the apparatus 800, the presence or absence of user contact with the apparatus 800, the azimuth or acceleration/deceleration of the apparatus 800, and temperature change of the apparatus 800. The sensor component 814 may include a proximity sensor configured to detect the presence of nearby objects without any physical contact. The sensor component 814 may further include an optical sensor, such as a complementary metal oxide semiconductor (CMOS) or a charge-coupled device (CCD) image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on the radio frequency identification (RFID) technology, infrared data association (IrDA) technology, ultra wideband (UWB) technology, Bluetooth (BT) technology, etc.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the above data transmission method applied to the UE side.

In an example, a non-transitory computer readable storage medium including executable instructions, such as the memory 804 including executable instructions, is further provided. The executable instructions may be executed by the processor 820 of the apparatus 800 to complete the above method. For example, the non-transitory computer readable storage medium may be a ROM, a random access memory (RAM), a CD-ROM, a magnetic tape, a floppy disk, an optical data storage device, etc.

Figure 7:
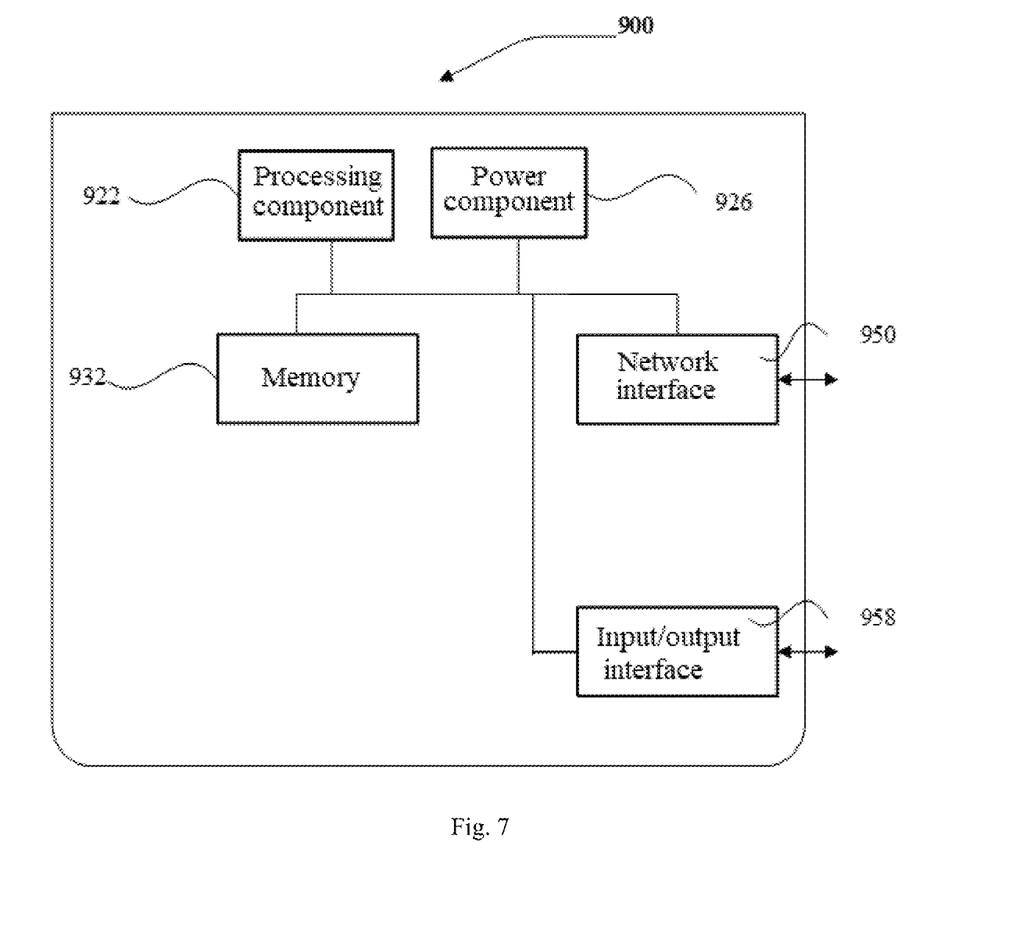
FIG. 7 is a block diagram of an apparatus 900 for implementing data transmission processing according to an example.

FIG. 7 is a block diagram of an apparatus 900 for implementing data transmission processing according to an example. For example, the apparatus 900 may be provided as a server. Referring to FIG. 7, the apparatus 900 includes a processing component 922 which further includes one or more processors, and a memory resource represented by a memory 932 and used for storing instructions executable by the processing component 922, such as applications. The applications stored in the memory 932 may include one or more modules, each corresponding to a set of instructions. In addition, the processing component 922 is configured to execute the instructions to execute the above data transmission method applied to the base station side.

The apparatus 900 may further include a power component 926 configured to execute power management of the apparatus 900, a wired or wireless network interface 950 configured to connect the apparatus 900 to a network, and an input/output (I/O) interface 958. The apparatus 900 may operate based on an operating system stored in the memory 932, such as Windows Server, Mac OS X™, Unix™, Linux™, FreeBSD™, etc.

The technical solutions described in the examples of the disclosure may be combined arbitrarily without conflict.

Other implementations of the disclosure will be apparent to those skilled in the art from consideration of the specification and practice of the disclosure herein. The application is intended to cover any variations, uses, or adaptations of the disclosure following the general principles of the disclosure and including such departures from the disclosure as come within known or customary practice in the art. It is intended that the specification and examples be considered as examples merely, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of the disclosure. It is intended that the scope of the disclosure merely be limited by the appended claims.

What is claimed is:

1. A data transmission method, applied to a base station, comprising:
   determining one or more listening frequency bands within an unlicensed frequency range; and determining a frequency band type of at least one listening frequency band in the one or more listening frequency bands, the frequency band type comprising at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission, and wherein determining the frequency band type of the at least one listening frequency band in the one or more listening frequency bands comprises:

determining, in response to receiving a scheduling request sent by user equipment (UE), that the frequency band type of at least one listening frequency band in the one or more listening frequency bands is the uplink listening frequency band.

2. The data transmission method according to claim 1, further comprising:

sending listening frequency band configuration information to the UE, the listening frequency band configuration information comprising frequency band type indication information, and the frequency band type indication information being used for indicating the frequency band type of one or more listening frequency bands within the unlicensed frequency range.

3. The data transmission method according to claim 2, wherein sending the listening frequency band configuration information to the UE comprises:

sending, via a broadcast message, the listening frequency band configuration information to the UE.

4. The data transmission method according to claim 2, wherein sending the listening frequency band configuration information to the UE comprises:

sending, via radio resource control (RRC) layer signaling, the listening frequency band configuration information to the UE.

5. The data transmission method according to claim 1, wherein a frequency of a listening frequency band with the frequency band type being the uplink listening frequency band is lower than a frequency of a listening frequency band with the frequency band type being the downlink listening frequency band.

6. The data transmission method according to claim 1, wherein determining the frequency band type of at least one listening frequency band in the one or more listening frequency bands comprises:

determining, in response to determining that communication with the UE is performed via the unlicensed frequency range and the unlicensed frequency range used for communication comprises two or more listening frequency bands, the frequency band type for at least one of the listening frequency bands, a quantity of listening frequency bands with the frequency band type being downlink listening frequency bands or uplink listening frequency bands being less than a total quantity of listening frequency bands comprised in the unlicensed frequency range.

7. The data transmission method according to claim 1, wherein determining the frequency band type of at least one listening frequency band in the one or more listening frequency bands comprises:

determining, in response to configuring the UE with resources for periodically transmitting physical uplink shared channel (PUSCH) information, that the frequency band type of at least one listening frequency band in the one or more listening frequency bands is the uplink listening frequency band.

8. A data transmission apparatus, comprising:

a processor; and a memory, configured to store executable instructions, wherein the processor is configured to implement the data transmission method according to claim 1 when executing the executable instructions.

9. A non-transitory computer readable storage medium, wherein executable instructions are stored in the computer readable storage medium, and the executable instructions, when executed by a processor, enable the processor to execute the data transmission method according to claim 1.

10. A data transmission method, applied to user equipment (UE), and comprising:

determining one or more listening frequency bands within an unlicensed frequency range;

determining a frequency band type of at least one listening frequency band in the one or more listening frequency bands within the unlicensed frequency range, the frequency band type comprising at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission; and ignoring, in response to determining that a scheduling instruction sent by a base station is received and the scheduling instruction indicates to transmit uplink data on a listening frequency band with the frequency band type being the downlink listening frequency band, the scheduling instruction.

11. The data transmission method according to claim 10, wherein before determining the frequency band type of at least one listening frequency band, the method further comprises:

obtaining listening frequency band configuration information sent by the base station, the listening frequency band configuration information comprising frequency band type indication information, and the frequency band type indication information being used for indicating the frequency band type of one or more listening frequency bands within the unlicensed frequency range.

12. The data transmission method according to claim 11, wherein obtaining the listening frequency band configuration information sent by the base station comprises:

receiving a broadcast message; and determining, based on the broadcast message, the listening frequency band configuration information.

13. The data transmission method according to claim 11, wherein obtaining the listening frequency band configuration information sent by the base station comprises:

receiving radio resource control (RRC) layer signaling; and determining, based on the RRC layer signaling, the listening frequency band configuration information.

14. The data transmission method according to claim 10, wherein determining the frequency band type of at least one listening frequency band comprises:

determining, in response to determining that communication with the base station is performed via the unlicensed frequency range and the unlicensed frequency range used for communication comprises two or more listening frequency bands, the frequency band type for at least one of the listening frequency bands, a quantity of listening frequency bands with the frequency band type being the downlink listening frequency bands or the uplink listening frequency bands being less than a total quantity of listening frequency bands comprised in the unlicensed frequency range.

15. The data transmission method according to claim 10, further comprising:

sending, via a listening frequency band with the frequency band type being the uplink listening frequency band, a scheduling request.

16. The data transmission method according to claim 10, further comprising:

transmitting, via a listening frequency band with the frequency band type being the uplink listening frequency band, physical uplink shared channel (PUSCH) information periodically.

17. A non-transitory computer readable storage medium, wherein executable instructions are stored in the computer storage medium, and the executable instructions, when executed by a processor, enable the processor to execute the data transmission method according to claim 8.

18. A data transmission apparatus, comprising:
a processor; and
a memory, configured to store executable instructions, wherein
the processor is configured to:
    determine one or more listening frequency bands within an unlicensed frequency range;
    determine a frequency band type of at least one listening frequency band in the one or more listening frequency bands within the unlicensed frequency range, the frequency band type comprising at least one of an uplink listening frequency band, a downlink listening frequency band, or an undefined listening frequency band, the downlink listening frequency band being used for downlink transmission, the uplink listening frequency band being used for uplink transmission, and the undefined listening frequency band being used for either uplink transmission or downlink transmission; and
    ignore, in response to determining that a scheduling instruction sent by the base station is received and the scheduling instruction indicates to transmit uplink data on a listening frequency band with the frequency band type being the downlink listening frequency band, the scheduling instruction.

* * * * *

UNITED STATES PATENT AND TRADEMARK OFFICE
CERTIFICATE OF CORRECTION

| | | |
|---|---|---|
| PATENT NO. | : 12,250,724 B2 | Page 1 of 1 |
| APPLICATION NO. | : 17/788728 | |
| DATED | : March 11, 2025 | |
| INVENTOR(S) | : Mingju Li | |

It is certified that error appears in the above-identified patent and that said Letters Patent is hereby corrected as shown below:

In the Specification

In Column 4, Line 30, delete "gate way" and insert -- gateway --, therefor.

In Column 4, Line 31, delete "gate way" and insert -- gateway --, therefor.

In Column 12, Line 47, delete "micro controller" and insert -- microcontroller --, therefor.

In Column 16, Line 42, delete "Windows Server," and insert -- Windows Server™, --, therefor.

In the Claims

In Column 19, Line 26, in Claim 17, delete "claim 8." and insert -- claim 10. --, therefor.

Signed and Sealed this
Twentieth Day of May, 2025

Coke Morgan Stewart
*Acting Director of the United States Patent and Trademark Office*